(12) United States Patent
Romero De La Osa et al.

(10) Patent No.: US 10,589,573 B2
(45) Date of Patent: Mar. 17, 2020

(54) CROWN REINFORCEMENT FOR AN AIRCRAFT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Marc Romero De La Osa, Clermont-Ferrand (FR); Serge Delacroix, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 388 days.

(21) Appl. No.: 15/036,608

(22) PCT Filed: Nov. 6, 2014

(86) PCT No.: PCT/EP2014/073865
§ 371 (c)(1),
(2) Date: May 13, 2016

(87) PCT Pub. No.: WO2015/071152
PCT Pub. Date: May 21, 2015

(65) Prior Publication Data
US 2016/0288576 A1  Oct. 6, 2016

(30) Foreign Application Priority Data
Nov. 15, 2013 (FR) ..................... 13 61197

(51) Int. Cl.
*B60C 9/18* (2006.01)
*B60C 9/20* (2006.01)
(Continued)

(52) U.S. Cl.
CPC ............ *B60C 9/2003* (2013.01); *B29D 30/22* (2013.01); *B29D 30/3035* (2013.01); *B60C 9/02* (2013.01);
(Continued)

(58) Field of Classification Search
CPC ..................... B60C 9/263; B60C 2009/2035
(Continued)

(56) References Cited

U.S. PATENT DOCUMENTS 5,427,167 A * 6/1995 Watanabe ............... B60C 9/263
152/526
7,360,571 B2 * 4/2008 Ueyoko ............. B29D 30/3035
152/531
(Continued)

FOREIGN PATENT DOCUMENTS

EP   0 540 303   5/1993
EP   0 850 787   7/1998
(Continued)

OTHER PUBLICATIONS

Machine Translation: JP-2002211208-A; Unoki, Takashi; (Year: 2019).*

*Primary Examiner* — Kendra Ly
(74) *Attorney, Agent, or Firm* — Cozen O'Connor

(57) ABSTRACT

Crown reinforcement of an aircraft tire comprises a working reinforcement (2) radially inside of tread (3) and radially outside of carcass reinforcement (4). Working reinforcement (2) comprises two working bi-plies (21, 22) radially superposed with respective axial widths ($L_1$, $L_2$), from first axial end ($I_1$, $I_2$) to second axial end ($I'_1$, $I'_2$). Each working bi-ply (21, 22) comprises two working layers (211, 212; 221, 222) radially superposed and respectively made up of axially juxtaposed portions of strip (5) of axial width W extending circumferentially in periodic curve (6) that forms, in the
(Continued)

equatorial plane (XZ) of the tire and with the circumferential direction (XX') of the tire, a non-zero angle A and has a radius of curvature R at its extrema (7). The difference DL between the respective axial widths ($L_1$, $L_2$) of the radially superposed working bi-plies (21, 22) is at least equal to $2 \times (W+(R-W/2)-(1-\cos A))$.

15 Claims, 4 Drawing Sheets

(51) Int. Cl.
- *B29D 30/20* (2006.01)
- *B29D 30/30* (2006.01)
- *B29D 30/70* (2006.01)
- *B60C 9/28* (2006.01)
- *B60C 9/26* (2006.01)
- *B29D 30/22* (2006.01)
- *B60C 9/02* (2006.01)
- *B60C 9/22* (2006.01)
- *B60C 11/00* (2006.01)
- *B29K 277/00* (2006.01)
- *B29K 621/00* (2006.01)
- *B60C 9/00* (2006.01)

(52) U.S. Cl.
CPC .......... *B60C 9/2009* (2013.01); *B60C 9/2204* (2013.01); *B60C 9/263* (2013.01); *B60C 9/28* (2013.01); *B60C 11/00* (2013.01); *B29D 2030/3078* (2013.01); *B29K 2277/00* (2013.01); *B29K 2277/10* (2013.01); *B29K 2621/00* (2013.01); *B29K 2713/02* (2013.01); *B60C 9/005* (2013.01); *B60C 9/0042* (2013.01); *B60C 2009/0035* (2013.01); *B60C 2009/2012* (2013.01); *B60C 2009/2016* (2013.01); *B60C 2009/2019* (2013.01); *B60C 2009/2035* (2013.01); *B60C 2009/2214* (2013.01); *B60C 2200/02* (2013.01)

(58) Field of Classification Search
USPC .......................................................... 156/117
See application file for complete search history.

(56) References Cited

U.S. PATENT DOCUMENTS

| | | | |
|---|---|---|---|
| 2005/0194081 A1* | 9/2005 | Yano | B29D 30/0661 152/527 |
| 2008/0105352 A1* | 5/2008 | Ueyoko | B60C 9/20 152/527 |

FOREIGN PATENT DOCUMENTS

| | | | |
|---|---|---|---|
| EP | 1 163 120 | 12/2001 | |
| EP | 1 381 525 | 1/2004 | |
| EP | 1 449 680 | 8/2004 | |
| EP | 1 518 666 | 3/2005 | |
| EP | 2 420 396 | 2/2012 | |
| FR | 2 910 381 | 6/2008 | |
| JP | 2002211208 A * | 7/2002 | B60C 9/263 |

* cited by examiner

CROWN REINFORCEMENT FOR AN AIRCRAFT TIRE

RELATED APPLICATIONS

This is a U.S. National Phase Application under 35 USC 371 of International Application PCT/EP2014/073865 filed on Nov. 6, 2014.

This application claims the priority of French application no. 1361197 filed Nov. 15, 2013, the entire content of which is hereby incorporated by reference.

FIELD OF THE INVENTION

The present invention relates to an aircraft tire and, in particular, to the crown reinforcement of an aircraft tire.

BACKGROUND OF THE INVENTION

In what follows, the circumferential, axial and radial directions of the tire respectively denote a direction tangential to the tread surface of the tire in the direction of rotation of the tire, a direction parallel to the axis of rotation of the tire and a direction perpendicular to the axis of rotation of the tire. "Radially on the inside or, respectively, radially on the outside" means "closer to or, respectively, further away from the axis of rotation of the tire". "Axially on the inside or, respectively, axially on the outside" means "closer to or, respectively, further away from the equatorial plane of the tire", the equatorial plane of the tire being the plane that passes through the middle of the tread surface of the tire and is perpendicular to the axis of rotation of the tire.

In general, a tire comprises a tread, intended to come into contact with the ground via a tread surface, the tread being connected by two sidewalls to two beads, the two beads being intended to provide a mechanical connection between the tire and a rim on which the tire is mounted.

A radial aircraft tire more particularly comprises a radial carcass reinforcement and a crown reinforcement both as described, for example, in document EP 1381525.

The radial carcass reinforcement is the tire reinforcing structure that connects the two beads of the tire. The radial carcass reinforcement of an aircraft tire generally comprises at least one carcass layer, each carcass layer being made up of reinforcers, usually textile, coated in a polymeric material of the elastomer or elastomer compound type, the reinforcers being mutually parallel and forming, with the circumferential direction, an angle of between 80° and 100°.

The crown reinforcement is the tire reinforcing structure radially on the inside of the tread and at least partially radially on the outside of the radial carcass reinforcement. The crown reinforcement of an aircraft tire generally comprises at least one crown layer, each crown layer being made up of mutually parallel reinforcers coated in a polymeric material of the elastomer or elastomer compound type. Among the crown layers a distinction is usually made between the working layers that constitute the working reinforcement, usually made up of textile reinforcers, and the protective layers that constitute the protective reinforcement, made up of metal or textile reinforcers and arranged radially on the outside of the working reinforcement. The working layers govern the mechanical behaviour of the crown reinforcement. The protective layers essentially protect the working layers from attack likely to spread through the tread radially towards the inside of the tire. A crown layer, and particularly a working layer, is geometrically characterized by its axial width, which means the distance between its axial ends.

The textile reinforcers of the carcass layers and of the crown layers are usually cords made of spun textile filaments, preferably made of aliphatic polyamide or of aromatic polyamide. The mechanical properties under tension (modulus, elongation and breaking force) of the textile reinforcers are measured after prior conditioning. "Prior conditioning" means the storage of the textile reinforcers for at least 24 hours, prior to measurement, in a standard atmosphere in accordance with European Standard DIN EN 20139 (temperature of 20±2° C.; relative humidity of 65±2%). The measurements are taken in the known way using a ZWICK GmbH & Co (Germany) tensile test machine of type 1435 or type 1445. The textile reinforcers are subjected to tension over an initial length of 400 mm at a nominal rate of 200 mm/min. All the results are averaged over 10 measurements.

An elastomeric material, such as the one used to coat the reinforcers of the carcass layers and of the crown layers, can be mechanically characterized, after curing, by tensile stress/strain characteristics determined by tensile testing. This tensile testing is carried out on a test specimen according to a method known to those skilled in the art, for example in accordance with international standard ISO 37 and under normal temperature (23+ or −2° C.) and relative humidity (50+ or −5% relative humidity) conditions defined by international standard ISO 471. The elastic modulus at 10% elongation of an elastomeric compound, expressed in megapascals (MPa), is the name given to the tensile stress measured for a 10% elongation of the test specimen.

During the manufacture of an aircraft tire and, more specifically, during the step of laying the working reinforcement, a working layer is usually obtained by a circumferential winding in turns or by a circumferential zigzag winding of a strip made up of at least one continuous textile reinforcer coated in an elastomeric compound, on the lateral surface of a building drum. Whether produced by circumferential winding in turns or circumferential zigzag winding, the working layer is then made up of the juxtaposition of a width of strip for each turn of winding.

A circumferential winding in turns means a winding in the circumferential direction of the tire and in a helix of diameter equal to the diameter of the building drum on which the strip is laid and with a mean angle of between 0° and 5° with respect to the circumferential direction. The working layer thus obtained by winding in turns is said to be circumferential because the angle of the textile reinforcers of the strip, one parallel to the next, formed in the equatorial plane with the circumferential direction, is between 0° and 5°.

Circumferential zigzag winding means a winding in the circumferential direction of the tire and with a periodic curve, which means to say one formed of periodic waves oscillating between extrema. Winding a strip with a periodic curve means that the mid-line of the wound strip, defined as being the line equidistant from the edges of the strip, coincides with the periodic curve. The peak-to-peak amplitude between the extrema of the periodic curve thus defines the axial width of the working layer, namely the distance between the axial ends thereof. The period of the periodic curve is usually between 0.5 times and 3 times the circumference of the building drum on which the strip is laid. The periodic curve is also characterized by the angle it forms, or more specifically by the angle that the tangent to the curve forms, in the equatorial plane of the tire with the circumferential direction of the tire, and by a radius of curvature, at the extrema of the periodic curve. For a conventional zigzag winding, the angle of the periodic curve, which corresponds to the angle formed by the textile reinforcers, one parallel to the next, that make up the strip, is generally between 5° and 35° with respect to the circumferential direction. A circumferential zigzag winding means that the working layers have to be assembled in pairs, a pair of working layers constituting a working bi-ply.

A working bi-ply is made up of two working layers radially superposed in the main section, namely in the portion axially on the inside of the two axial ends of the working bi-ply, and by more than two working layers radially superposed at the axial ends thereof. The additional number of additional working layers in the radial direction, at the axial ends, in comparison with the two working layers in the main section is referred to as the axial end additional thickness. This axial end additional thickness is generated by the crossings of strip at the extrema of the periodic curve. A working reinforcement is thus made up of the radial superposition of several working bi-plies. Such a working reinforcement comprising working layers obtained by circumferential zigzag winding of a strip has been described in documents EP 0540303, EP 0850787, EP 1163120 and EP 1 518 666.

In the case of circumferential zigzag winding, it is known that the axial end additional thicknesses of the working bi-plies are sensitive to the onset of endurance damage, such as cracks which may evolve into significant degradation of the working reinforcement and, therefore, reduce the life of the tire. These cracks may appear at the internal interfaces of an axial end additional thickness of a working bi-ply, or at the interface between the axial end additional thicknesses of two adjacent working by-plies.

Document FR 2910381 describes an aircraft tire that can be used at high speed, under heavy load, while having a low weight. Such a tire comprises a working reinforcement comprising at least one working layer wound in turns radially on the inside and at least two working layers wound in a zigzag radially on the outside, at least one working layer wound in turns being wider than the zigzag working layers.

SUMMARY OF THE INVENTION

One object of the present invention is to improve the endurance of the working reinforcement of an aircraft tire by making the axial end additional thicknesses of the working layers less sensitive to the risk of cracking.

This objective has been achieved, according to one aspect of the invention, by an aircraft tire comprising:

a working reinforcement radially on the inside of a tread and radially on the outside of a carcass reinforcement, the working reinforcement comprising at least two working bi-plies which are radially superposed and respectively have an axial width ($L_1$, $L_2$), from a first axial end to a second axial end, each working bi-ply comprising at least in part two working layers that are radially superposed and respectively made up of an axial juxtaposition of portions of strip, the strip, of axial width W, extending circumferentially in a periodic curve that forms, in the equatorial plane of the tire and with the circumferential direction of the tire, a non-zero angle A and has a radius of curvature R at its extrema, the strip being made up of reinforcers coated in an elastomeric compound, the difference DL between the respective axial widths ($L_1$, $L_2$) of the at least two radially superposed working bi-plies being at least equal to $2\times(W+(R-W/2)\times(1-\cos A))$.

Working bi-plies that are radially superposed means two working bi-plies at least partially in contact with one another and not radially separated by some other element. In other words, these are two working bi-plies that are consecutive in the radial direction.

A working bi-ply that makes up the working reinforcement is, by definition, made up of the radial superposition of two working layers. The width of the working bi-ply is equal to the axial width of the widest working layer. The axial width of a working layer is measured between the axial ends of the working layer, namely between the axially outermost points of the working layer. The axial ends of the working layer are embodied on the tire by the axially outermost textile reinforcers.

The difference DL between the respective axial widths ($L_1$, $L_2$) of the at least two working bi-plies, namely of two consecutive working bi-plies, corresponds to twice the axial distance between the respective axial ends of the two working bi-plies.

A minimum value of $2\times(W+(R-W/2)\times(1-\cos A))$ for the difference DL between the respective axial widths ($L_1$, $L_2$) of the at least two working bi-plies ensures that the axial end additional thicknesses of two consecutive working bi-plies are offset from one another and therefore not radially superposed on one another. Eliminating this radial superposition which has been identified as being particularly sensitive to cracking means that the endurance of the working reinforcement in this region can be improved. In addition, this offsetting allows the axial end additional thickness of the radially outermost working bi-ply to be in contact with the main section of the radially innermost working bi-ply, via a planar surface.

The axial width W of the strip is advantageously at least equal to 2 mm, preferably at least equal to 6 mm. A strip generally comprises at least 2 textile reinforcers, the diameter of which is approximately equal to 1 mm, giving a minimum strip width of 2 mm. A strip width at least equal to 6 mm makes it possible to reduce the laying time required to create the working bi-ply, thereby increasing productivity.

The axial width W of the strip is also advantageously at most equal to 20 mm, preferably at most equal to 14 mm. The higher the width of the strip, the higher the number of interfaces between strip portions in the axial end additional thicknesses, and therefore the higher the risk of cracking. Thus, a strip width at most equal to 20 mm, and preferably at most equal to 14 mm, guarantees a good compromise between endurance and productivity.

It is also advantageous for the ratio R/W between the radius of curvature R, at the extrema of the periodic curve of the strip, and the width W of the strip to be at least equal to 13. In other words, the radius of curvature R needs to be large enough in comparison with the width W of the strip. This minimum value makes it possible to avoid the risk of the strip buckling outside its plane while the strip is being laid during manufacture, during the changes in direction at the extrema of the periodic curve.

The angle A formed by the periodic curve of the strip in the equatorial plane and with the circumferential direction is advantageously at least equal to 3°, preferably at least equal to 5°. This minimum value for the angle makes it possible to guarantee minimal cornering stiffness for the working reinforcement, the cornering stiffness being defined as being the torque that has to be applied to the tire in order to obtain a 1° angle of rotation about the radial direction of the tire.

The angle A, formed by the periodic curve of the strip in the equatorial plane and with the circumferential direction is also advantageously at most equal to 35°, preferably at most to 25°. This maximum angle value makes it possible to guarantee maximum working reinforcement cornering stiffness.

According to one preferred embodiment, the reinforcers of the strip are made of a textile material. The textile reinforcers are usually used for the working reinforcement of an aircraft tire because they make it possible to achieve a good compromise between mechanical properties, in terms of stiffness and strength, and mass.

According to a first preferred alternative form of embodiment, the reinforcers of the strip are made of an aliphatic polyamide, which is a textile material. Indeed, reinforcers made of aliphatic polyamide, such as nylon, are commonly used in the field of aircraft tires because they have a relatively low mass, allowing a significant saving on the mass of the tire and therefore a gain in the payload that the aircraft can carry.

According to a second preferred alternative form of embodiment, the reinforcers of the strip are made of an aromatic polyamide, which is a textile material. Reinforcers made of aromatic polyamide, such as aramid, in fact make it possible to achieve a good compromise between mechanical strength and weight. Reinforcers made of aromatic polyamide make it possible to reduce the mass of the working layer, in comparison with reinforcers made of aliphatic polyamide, for a working layer of given breaking strength.

According to a third preferred alternative form of embodiment, the reinforcers of the strip are made of a combination of an aliphatic polyamide and of an aromatic polyamide, which are, respectively, two textile materials. Such reinforcers are generally referred to as hybrid reinforcers and offer the technical advantages of nylon and of aramid: mechanical strength, tensile deformability and lightness of weight. In particular, they exhibit bi-modulus behaviour characterized by a low elastic modulus at small elongations and a higher modulus at higher elongations. Hybrid reinforcers also allow a reduction in the mass of the working layer, in comparison with reinforcers made of aliphatic polyamide, for a working layer of given breaking strength.

Another aspect of the invention relates to a method of manufacturing an aircraft tire according to an embodiment of the invention. This method comprises a step of manufacturing the working reinforcement, in which step the at least two working bi-plies that are radially superposed and respectively have an axial width ($L_1$, $L_2$), from a first axial end to a second axial end, are obtained by circumferential zigzag winding of a strip, of axial width W, on the surface of a tire building drum of radius $R_f$ and having as its axis the axis of rotation of the tire, with a periodic curve that forms, in the equatorial plane and with the circumferential direction, a non-zero angle A and has a radius of curvature R at its extrema such that the difference DL between the respective axial widths ($L_1$, $L_2$) of the at least two radially superposed working bi-plies is at least equal to $2 \times (W+(R-W/2) \times (1-\cos A))$.

BRIEF DESCRIPTION OF THE DRAWINGS

The features and other advantages of the invention will be better understood with the aid of FIGS. 1 to 4, which have not been drawn to scale.

DETAILED DESCRIPTION OF THE DRAWINGS

Figure 1:
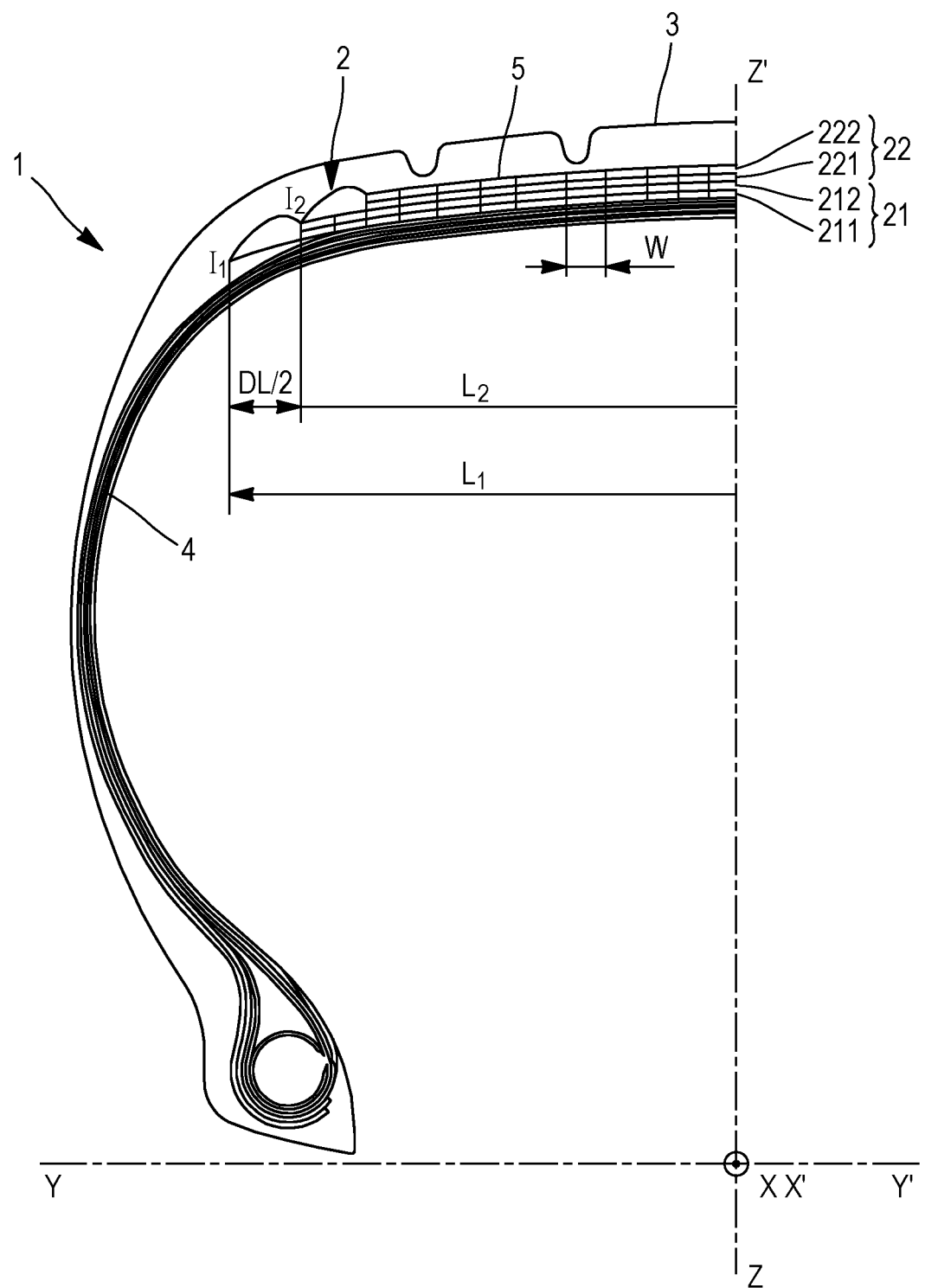
FIG. 1: a half-view in section of a tire according to the invention, in a meridian or radial plane (YZ) passing through the axis of rotation (YY') of the tire.

FIG. 1 depicts a half-view in section, in a radial or meridian plane (YZ) passing through the axis of rotation (YY') of the tire 1, of an aircraft tire 1 comprising a working reinforcement 2 radially on the inside of a tread 3 and radially on the outside of a carcass reinforcement 4. The working reinforcement 2 comprises two working bi-plies (21, 22) that are radially superposed and respectively have an axial width ($L_1$, $L_2$) from a first axial end ($I_1$, $I_2$) to a second axial end ($I'_1$, $I'_2$) (not depicted). Each working bi-ply (21, 22) comprises, at least in part, two working layers (211, 212; 221, 222) which are radially superposed and respectively made up of an axial juxtaposition of strips 5 of width W.

Figure 2:
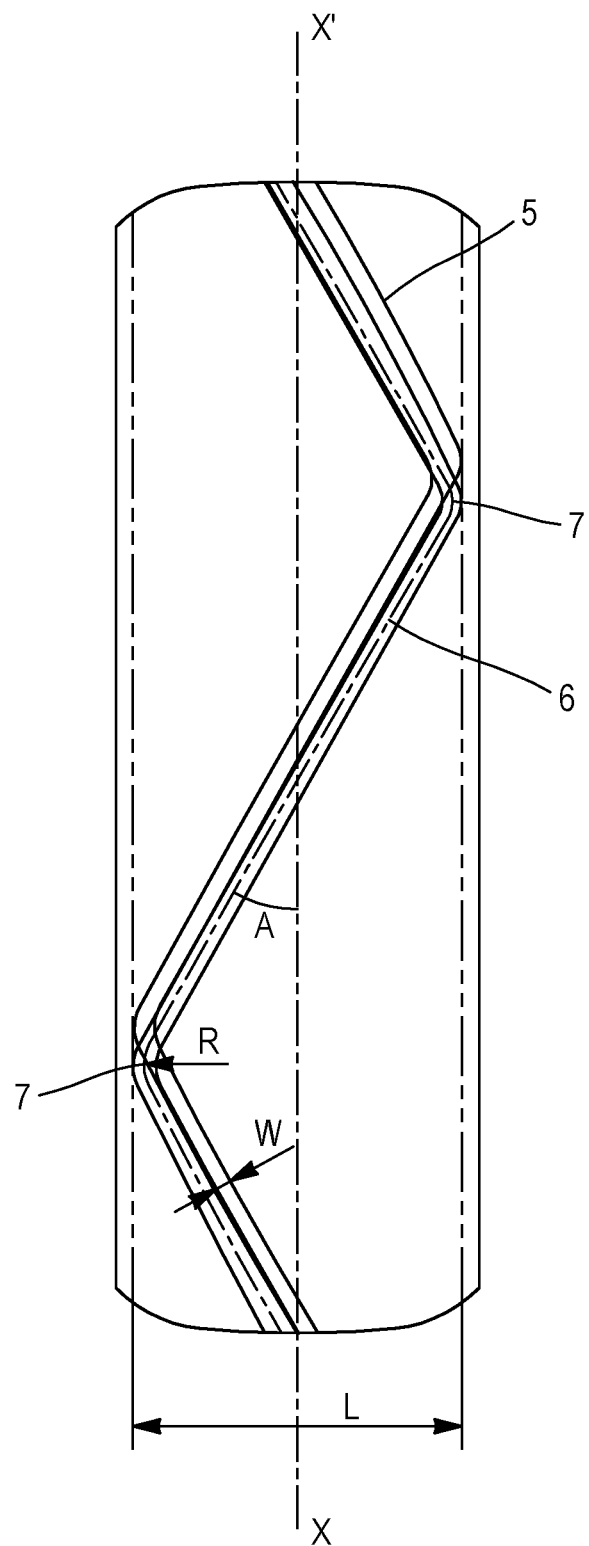
FIG. 2: a general arrangement of a strip that makes up a working layer of a tire according to the invention.

FIG. 2 depicts a general arrangement of a strip 5 that makes up a working bi-ply of axial width L. In FIG. 2, a zigzag winding over two turns is depicted. The strip 5 of width W has a mid-line, running circumferentially, namely in the direction (XX') along a periodic curve 6 comprising extrema 7. In other words, the periodic curve 6 is the curve supporting the mid-line of the strip 5. The periodic curve 6 forms, in the equatorial plane (XZ) and with the circumferential direction (XX'), a non-zero angle A. The periodic curve 6 has a mean radius of curvature R at its extrema 7. With each turn of zigzag winding the strip 5 is offset axially so as to obtain an axial juxtaposition of strip portions of width W.

Figure 3A:
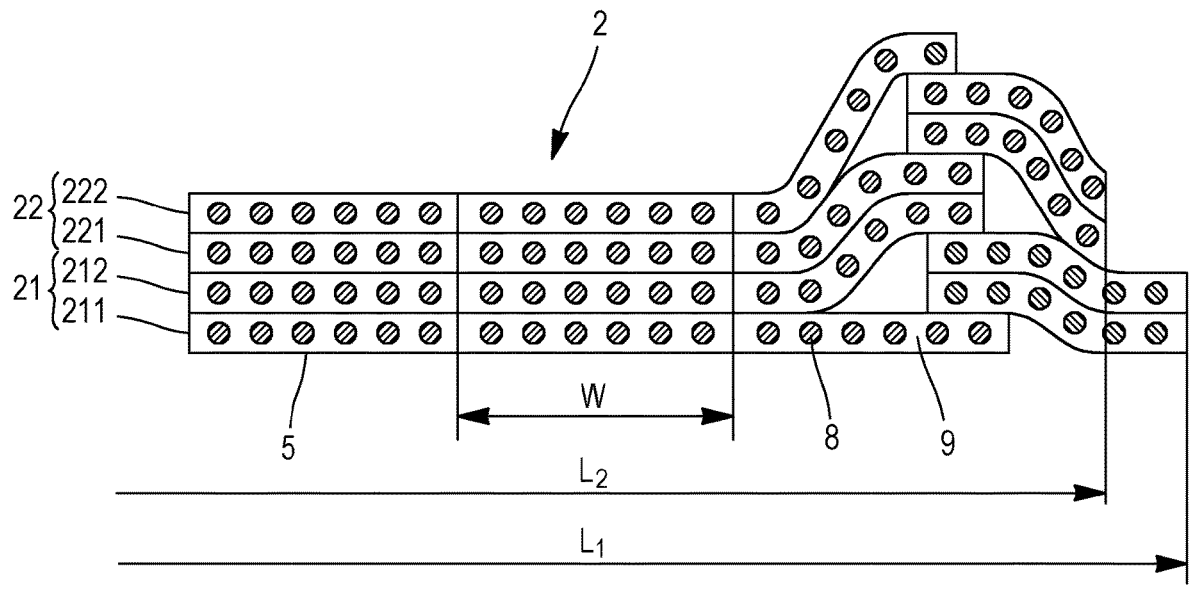
FIGS. 3A and 3B: views in section, on a meridian plane (YZ), of the axial end zones of two consecutive working bi-plies of a reference tire (FIG. 3A) and of a tire according to the invention (FIG. 3B), respectively.

FIG. 3A is a view in section, in a radial plane (YZ), from an axial end zone of two working bi-plies (21, 22) of a working reinforcement 2 of a reference tire. Each working bi-ply (21, 22), respectively of axial width $L_1$ and $L_2$, is made up of 2 radially superposed working layers (211, 212; 221, 222) in the main section and 4 partially superposed working layers at the axial end additional thickness. Each working layer (211, 212; 221, 222) is made up of an axial juxtaposition of portions of strip 5 of width W. Each portion of strip 5 comprises textile reinforcers 8 coated in an elastomeric compound 9. In the case of the reference tire, the respective axial end additional thicknesses of the two working bi-plies (21, 22) are at least partially radially superposed.

Figure 3B:
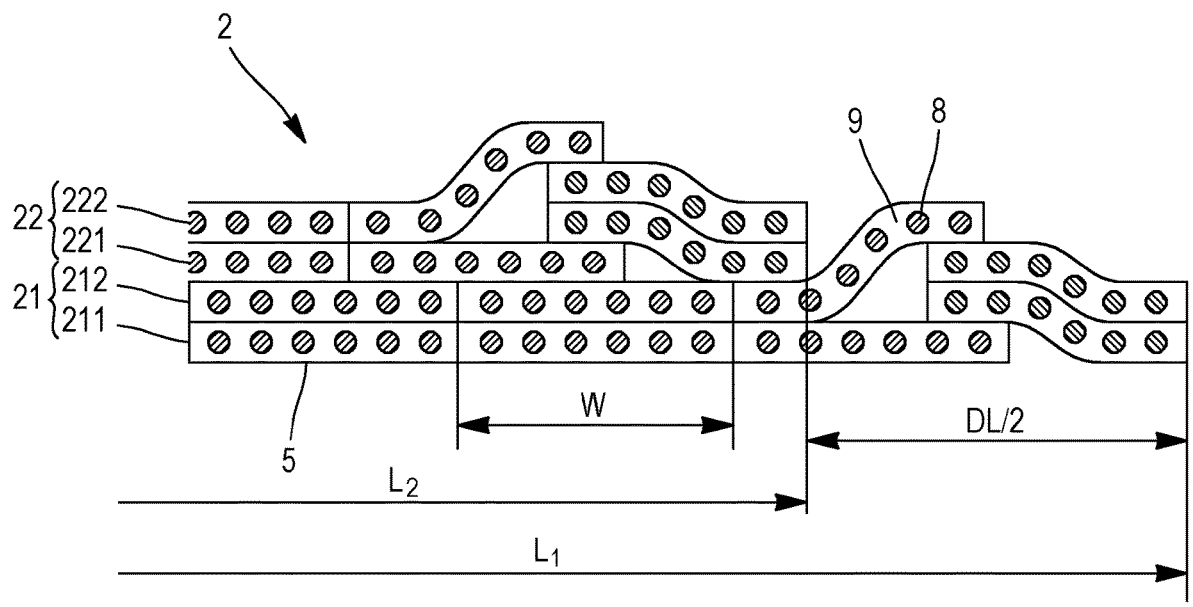

FIG. 3B is a view in section, in a radial plane (YZ), of an axial end zone of two working bi-plies (21, 22) of a working reinforcement 2 of a tire according to the invention. In this case, the respective axial end additional thicknesses of the two working bi-plies (21, 22) are axially offset by an axial distance DL/2 at each of the two axial end zones.

Figure 4:
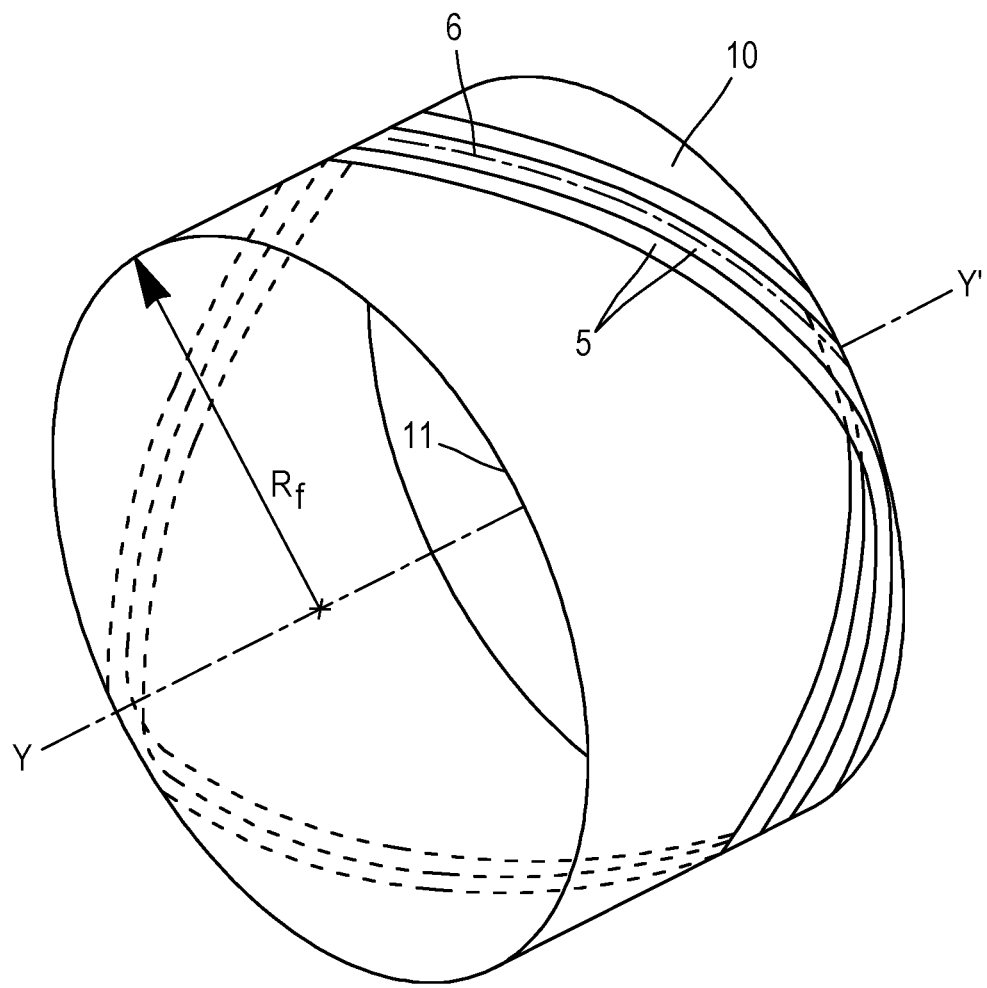
FIG. 4: a perspective view of a strip circumferentially wound in a zigzag, with a periodic curve on the surface of a building drum.

FIG. 4 is a perspective view of a strip 5 wound circumferentially in a zigzag, with a periodic curve 7, on the lateral surface 10 of a tire building drum 11 of radius $R_f$ and having as its axis the axis of rotation (YY') of the tire.

The inventors carried out the invention for an aircraft tire of size 1400×530 R 23.

In the tire investigated, the working reinforcement comprises two radially superposed working bi-plies, the radially innermost working bi-ply having an axial width $L_1$ equal to 379 mm and the radially outermost working bi-ply having an axial width $L_2$ equal to 349 mm. The difference DL between the respective axial widths ($L_1$, $L_2$) of the two radially superposed working bi-plies is, in this instance, equal to 30 mm. Since the strip that makes up a working bi-ply of width W equal to 11 mm wound in a zigzag in a periodic curve forming, in the equatorial plane of the tire and with the circumferential direction of the tire, an angle A of the order of 10° and having a radius of curvature R of the order of 200 mm at its extrema, the difference DL, equal to 30 mm, is therefore greater than 2×(W+(R−W/2)×(1−cos A) which equals 28 mm. Furthermore, the ratio R/W is equal to 18, and therefore higher than 13. Furthermore, the textile reinforcers of the strip are hybrid reinforcers made up of a combination of an aliphatic polyamide and of an aromatic polyamide. The gain in endurance of a tire comprising two working bi-plies according to the invention, by comparison with the reference tire, is estimated to be equal to at least 10%. This endurance is measured in terms of the amount of damage found on a tire subjected to a regulation TSO test as defined by the European Aviation European Safety Agency (EASA).

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An aircraft tire comprising:
    a working reinforcement radially on an inside of a tread and radially on an outside of a carcass reinforcement;
    the working reinforcement comprising at least two working bi-plies which are radially superposed and respectively have an axial width, from a first axial end to a second axial end;
    each said working bi-ply having a main section comprising at least in part two working layers that are radially superposed, a first, radially outer, one of the at least two working bi-plies comprising, at an axial end thereof, a first axial-end additional thickness, extending axially to an outside of the main section of the first bi-ply, the first axial-end additional thickness comprising a first set of two additional working layers sandwiched between the two working layers of the first bi-ply such that the first axial-end additional thickness is four superposed working layers, each working layer being respectively made up of an axial juxtaposition of portions of a strip, and a second, radially inner, one of the two working bi-plies comprising, at an axial end thereof, a second axial-end additional thickness, extending axially to an outside of the main section of the second bi-ply, the second axial-end additional thickness comprising a second set of two additional working layers sandwiched between the two working layers of the second bi-ply,
    wherein the working reinforcement comprises six working layers only in a region of axial overlap between the first axial-end additional thickness and the main section of the second, radially inner, bi-ply;
    the strip, of axial width W, extending circumferentially in a periodic curve that forms, in the equatorial plane of the tire and with the circumferential direction of the tire, a non-zero angle A and has a radius of curvature R at its extrema;
    the strip being made up of reinforcers coated in an elastomeric compound;
    wherein a difference DL between the respective axial widths of the at least two radially superposed working bi-plies is at least equal to $2\times(W+(R-W/2)\times(1-\cos A))$,
    wherein the first, radially outer, one of the at least two working bi-plies contacts the second, radially inner, one of the at least two working bi-plies, over their respective axial widths axially inwardly of the first axial-end additional thickness, and the first and second axial-end additional thicknesses are axially offset by a distance of DL/2.

2. The aircraft tire according to claim 1, wherein the axial width W of the strip is at least equal to 2 mm.

3. The aircraft tire according to claim 1, wherein the axial width W of the strip is at most equal to 20 mm.

4. The aircraft tire according to claim 1, wherein a ratio R/W between the radius of curvature R, at the extrema of the periodic curve of the strip, and the width W of the strip is at least equal to 13.

5. The aircraft tire according to claim 1, wherein the non-zero angle A formed by the periodic curve of the strip in the equatorial plane and with the circumferential direction is at least equal to 3°.

6. The aircraft tire according to claim 1, wherein the non-zero angle A, formed by the periodic curve of the strip in the equatorial plane and with the circumferential direction is at most equal to 35°.

7. The aircraft tire according to claim 1, wherein the reinforcers of the strip are made of a textile material.

8. The aircraft tire according to claim 1, wherein the reinforcers of the strip are made of an aliphatic polyamide.

9. The aircraft tire according to claim 1, wherein the reinforcers of the strip are made of an aromatic polyamide.

10. The aircraft tire according to claim 1, wherein the reinforcers of the strip are made of a combination of an aliphatic polyamide and of an aromatic polyamide.

11. Method of manufacturing an aircraft tire according to claim 1, comprising a step of manufacturing the working reinforcement, wherein the at least two working bi-plies that are radially superposed and respectively have an axial width, from a first axial end to a second axial end, are obtained by circumferential zigzag winding of the strip, of axial width W, on the lateral surface of a tire building drum of radius $R_f$ and having as its axis the axis of rotation of the tire, with the periodic curve forming, in the equatorial plane and with the circumferential direction, the non-zero angle A and having the radius of curvature R at its said extrema such that the difference DL between the respective axial widths of the at least two radially superposed working bi-plies is at least equal, in terms of absolute value, to $2\times(W+(R-W/2)\times(1-\cos A))$.

12. The aircraft tire according to claim 1, wherein the axial width W of the strip is at least equal to 6 mm.

13. The aircraft tire according to claim 1, wherein the axial width W of the strip is at most equal to 14 mm.

14. The aircraft tire according to claim 1, wherein the non-zero angle A formed by the periodic curve of the strip in the equatorial plane and with the circumferential direction is at least equal to 5°.

15. The aircraft tire according to claim 1, wherein the non-zero angle A, formed by the periodic curve of the strip in the equatorial plane and with the circumferential direction is at most equal to 25°.

* * * * *